(12) United States Patent
Tester et al.

(10) Patent No.: US 7,286,545 B1
(45) Date of Patent: Oct. 23, 2007

(54) SERVICE BROKER

(75) Inventors: W. Scott Tester, Apex, NC (US); Drue Merkle, Cary, NC (US); Donald McKinney, Apex, NC (US); Scott Ajax, Raleigh, NC (US); William D. Gentry, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 1017 days.

(21) Appl. No.: 10/106,415

(22) Filed: Mar. 26, 2002

(51) Int. Cl.
*H04L 12/28* (2006.01)

(52) U.S. Cl. ............................ 370/401; 370/230

(58) Field of Classification Search ............ 370/216, 370/219, 220, 230, 352, 401, 402
See application file for complete search history.

(56) References Cited

U.S. PATENT DOCUMENTS

| | | | |
|---|---|---|---|
| 6,515,985 B2 * | 2/2003 | Shmulevich et al. ....... 370/356 |
| 6,728,239 B1 * | 4/2004 | Kung et al. ................. 370/352 |
| 6,799,210 B1 * | 9/2004 | Gentry et al. ............... 709/223 |
| 6,836,478 B1 * | 12/2004 | Huang et al. ............... 370/352 |
| 6,876,646 B1 * | 4/2005 | Dore et al. ................. 370/352 |
| 6,888,839 B1 * | 5/2005 | Scoggins et al. ........... 370/410 |
| 6,917,610 B1 * | 7/2005 | Kung et al. ................. 370/352 |
| 7,068,624 B1 * | 6/2006 | Dantu et al. ................ 370/331 |
| 7,180,889 B1 * | 2/2007 | Kung et al. ................. 370/352 |
| 2003/0099192 A1 * | 5/2003 | Scott et al. ................. 370/229 |
| 2003/0161296 A1 * | 8/2003 | Butler et al. ............... 370/352 |

* cited by examiner

*Primary Examiner*—Phirin Sam
(74) *Attorney, Agent, or Firm*—Withrow & Terranova, PLLC

(57) ABSTRACT

The present invention relates to a service broker capable of dynamically provisioning media gateways, gateway controllers, and call servers when adding one or more of these elements to the network, or reconfiguring the network when an element fails or to balance loads. Based on defined guidelines or rules, the service broker can select gateway controllers for media gateways, call servers for gateway controllers, and backup elements for any of the above. Once selected, the service broker notifies all affected elements of their associations.

26 Claims, 5 Drawing Sheets

SERVICE BROKER

FIELD OF THE INVENTION

The present invention relates to telecommunications, and particularly, to providing provisioning and allocating media gateways, gateway controllers, and call servers.

BACKGROUND OF THE INVENTION

There is a growing interest in the convergence of circuit-switched networks, such as the public switched telephone network (PSTN), the Internet and other inter- and intranets. The convergence of these networks requires technology that facilitates interworking in a uniform and effective manner. The next generation of unified networks will provide an open and scalable architecture to accommodate multiple vendors and protocols under a single communication scheme. At the moment, there are several obstacles to providing a scalable, unified network incorporating circuit-switched networks, Internet, cable systems, and wireless systems, among other existing and future networks.

For example, the traditional PSTN provides constant-bandwidth, media streams of information between users. These media streams typically originate and terminate over dedicated access circuits. Circuit-switched networks were originally designed for carrying voice traffic and handling calling patterns, but with the emergence of the Internet, are now handling significant amounts of data traffic. The data traffic occupies a significant amount of the bandwidth of the circuit-switched network as the data makes its way to Internet protocol (IP)-based networks. In addition, the IP-based networks are now carrying significant amounts of data that relate to voice, fax and video, in addition to conventional data. Further, advances in cable and wireless technologies are requiring cable networks and wireless networks to efficiently interact with the PSTN and the IP-based Internet.

Since packet switching networks appear to be the common thread between all of the many networks, there is a need to seamlessly interwork all networks and individual endpoints connecting to these networks. The interface between networks, as well as between a network and individual endpoints, is provided by media gateways. Media gateways require interaction with gateway controllers and call servers to provide decision-making and coordination with other media gateways.

The primary responsibility of the media gateway is to allow media of various types, including voice, fax, video, and data, to be transported in a unified network. Typically, the media must be transportable both as packets in a packet-based network and as digital or analog streams in a circuit-switched network. In such applications, the media gateway provides bi-directional communications between a circuit-switched network and media-related elements associated with packet network, such as an IP or ATM network. Media gateways generally interact with end users in telephony applications or with other media gateways to facilitate such applications. The gateway controllers cooperate with call servers to provide media gateways with instructions on interconnecting two or more telephony or IP elements in order to exchange information. For example, call servers, via gateway controllers, instruct media gateways on how to set up, handle, and terminate media flows, such as Internet connections or telephone calls.

In general, media gateways are assigned to and served by a designated gateway controller. Similarly, gateway controllers are assigned to and served by designated call servers. Typically, the media gateways, gateway controllers and call servers reside on a packet-switched network and must be manually provisioned to facilitate the various assignments. As the number of these devices increases, the difficulty provisioning and managing the assignments grows exponentially. Any time a gateway controller or call server fails, reassignment and provisioning of the affected devices are necessary. Further, as networks expand and evolve, restructuring is often necessary to provide load balancing, ensure sufficient capacity, and the like. Unfortunately, when the number of media gateways increases into the thousands, manual provisioning not only becomes cumbersome, but often results in less than optimal performance.

Accordingly, there is a need for a more efficient and flexible architecture facilitating dynamic assignment and provisioning of media gateways, gateway controllers, and call servers.

SUMMARY OF THE INVENTION

The present invention relates to a service broker capable of dynamically provisioning media gateways, gateway controllers, and call servers when adding one or more of these elements to the network, or reconfiguring the network when an element fails or to balance loads. Based on defined guidelines or rules, the service broker can select gateway controllers for media gateways, call servers for gateway controllers, and one or more backup elements for any of the above. Once selected, the service broker notifies all affected elements of their associations.

The service broker may implement a fail-over mechanism when a gateway controller or call server fails. During such failure, supported elements are reconfigured to be supported by backup elements. Further, the backup elements are con-figured for their new responsibilities. The service broker can also keep track of loads and capacities and provide automatic load balancing when adding new media gateways and gateway controllers, or can reconfigure the allocation of elements in light of unbalanced loads.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
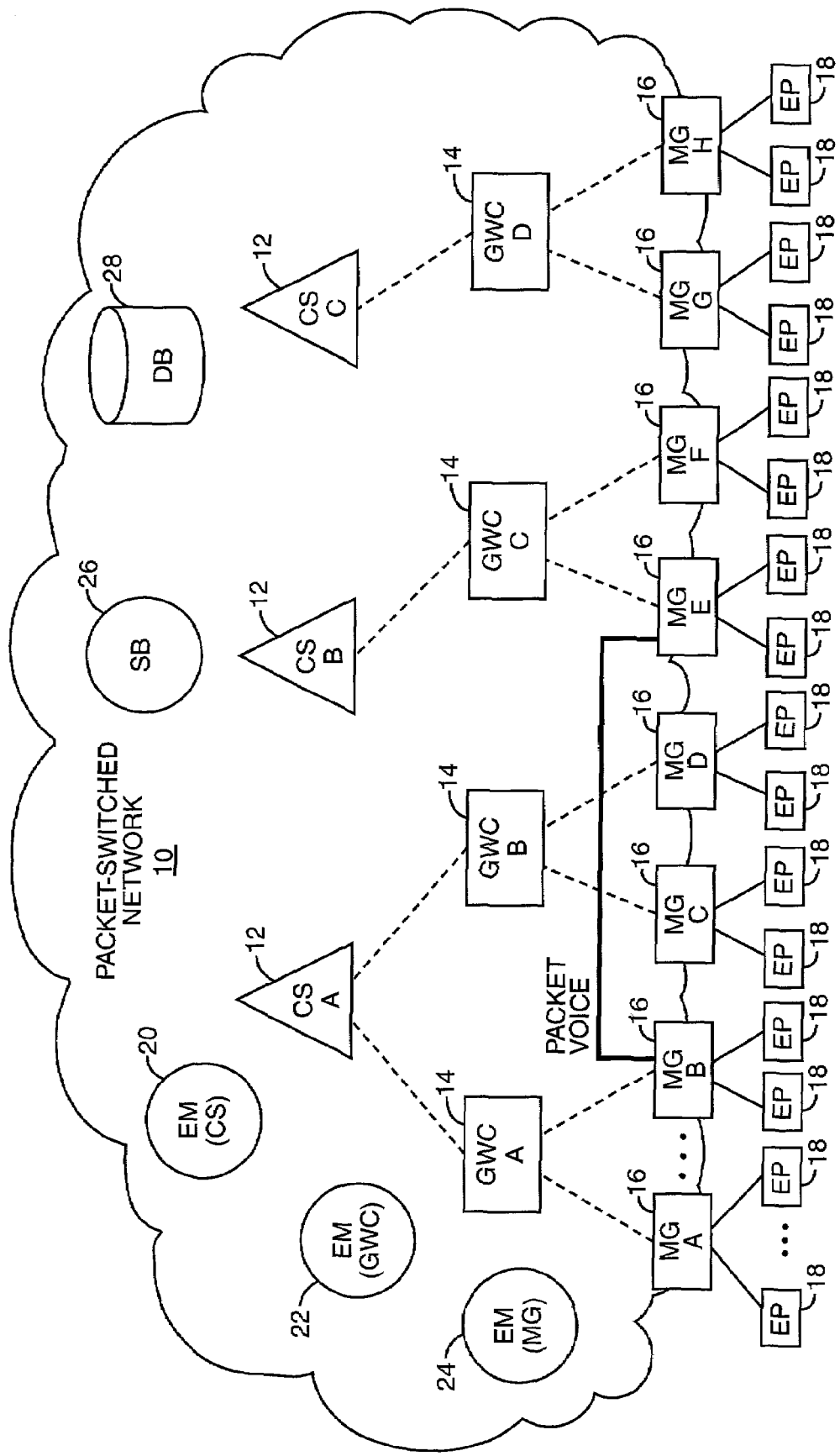
FIG. 1 is a communication network configured according to a first embodiment of the present invention.

The present invention facilitates automated assignment and provisioning for media gateways, gateway controllers, and call servers, which support communications over the public switched telephone network (PSTN), enterprise networks, cable networks, wireless networks, multi-purpose packet switching networks, and the like. With reference to FIG. 1, a communication environment is centered about a packet-switched network 10 having multiple call servers (CS) 12, gateway controllers (GWC) 14, and media gateways (MG) 16, which cooperate to facilitate media sessions between endpoints 18. The call servers 12, gateway controllers 14, and media gateways 16 are logical elements that may be implemented separately on distinct hardware elements, combined in various ways on a single hardware element, or distributed separately or in combination among various hardware elements. These logical elements are depicted and described as separate logical elements in separate location for clarity. Those skilled in the art will appreciate the flexibility in implementation.

The media gateways 16 are an interface between the packet-switched network 10 and the endpoints 18 and provide protocol conversion and data transformation to allow the seamless flow of data and control signaling between the endpoints 18 and the packet-switched network 10. The primary responsibility of a media gateway 16 is to allow media of various types, such as data, voice, and video, to be transported via the packet-switched network 10 from one endpoint 18 to another. Media gateways 16 are configured to allow media to be transportable, both as packets and as analog or digital streams in more traditional circuit-switched networks without loss of integrity or quality between networks and network technologies. For example, the media gateways 16 may range in functionality and size from a cable modem coupled to a cable television network to a switching device handling thousands of telephony-type endpoints 18 through various time-division multiplexed (TDM) lines and trunks.

Communications between any two or more endpoints 18 require call signaling to establish a media flow between the endpoints 18. An established media flow between any two endpoints 18 involves delivering content across an access network connecting a first endpoint 18 to a supporting media gateway 16, which will convert the content into a packet form for delivery to a second media gateway 16 supporting the second endpoint 18. The second media gateway 16 will convert the packets associated with the media flow to an appropriate format for delivery to the second endpoint 18. The first and second media gateways 16 provide all necessary content and protocol conversion for the media flow between the two endpoints 18. An exemplary voice-over-IP media session is illustrated.

Each media gateway 16 supports a number of endpoints 18, and each gateway controller 14 supports a number of media gateways 16. Continuing the hierarchical relationship, each call server 12 supports a number of gateway controllers 14. The primary responsibilities of the call servers 12 are to make decisions based on flow-related information and to provide instructions on interconnecting endpoints 18 within and throughout the networks. Call servers 12 store status information on media flows and may be used to generate administrative records for a variety of media-related activities, such as billing. Most prominently, call servers 12 provide coordination of media gateways 16 via the gateway controllers 14.

Through the gateway controllers 14, the call servers 12 direct the media gateways 16 to set up, handle and terminate individual media flows. The gateway controllers 14 provide an interface to the media gateways 16 associated with a given call server 12. The primary responsibility of the gateway controller 14 is to support protocols for interaction with media gateways 16 and messaging between itself and other gateway controllers 14 to facilitate call server functionality. As an analogy, call servers 12 implement the call control functionality that is used to control switching elements in a PSTN. The switching elements that provide the media path for the call are analogous to the media gateways 16. Notably, this disclosure anticipates the replacement of switching elements of the PSTN with media gateways 16 that are controlled by the gateway controllers 14.

Since media gateways 16 are assigned to select gateway controllers 14, and the gateway controllers 14 are assigned to select call servers 12, each of these devices must be provisioned in a manner defining and identifying these relationships. In the past, the media gateways 16, gateway controllers 14, and call servers 12 were manually provisioned to facilitate the assignments. Various types of element managers are provided to facilitate management of the elements. For example, a call server element manager (EM) 20 as an interface used to facilitate interaction and management of call server functions, such as translations, billing, and network functions. Similarly, a gateway controller element manager 22 facilitates the interaction and management of the gateway controllers 14, while a media gateway element manager 24 is used to control the interaction and management of the media gateways 16. Accordingly, these element managers 20, 22, 24 have the ability to receive and send data updates to the corresponding media gateways 16, gateway controllers 14, and call servers 12. Further, the element managers 20, 22, 24 contain the IP addresses of the associated elements and a cached copy of the data configuration information associated with the managed elements. The element managers 20, 22, 24 may also maintain a maintenance state for the corresponding elements. Prior to the present invention, the media gateways 16, gateway controllers 14, and call servers 12 were assigned and provisioned in a manual fashion directly or via their respective element managers 24, 22, and 20.

Such assignment and provisioning entails assigning a group of media gateways 16 to a gateway controller 14, and assigning the gateway controller 14 to a call server 12. The media gateways 16 must be identified to the serving gateway controller 14. Similarly, the gateway controller 14 must be identified to the media gateways 16. The gateway controller 14 must also be identified to the call server 12, and the call server 12 must be identified to the gateway controller 14. In addition to providing primary associations between the elements, backup associations between media gateways 16 and gateway controllers 14, and gateway controllers 14 and call servers 12, are often provisioned in case an element fails.

As the number of media gateways 16 and endpoints 18 increases, the difficulty in manually provisioning and managing the assignments grows exponentially. Any time a gateway controller 14 or a call server 12 fails, reassignment provisioning of the affected devices is necessary. In addition to simply providing initial and backup assignments, it is desirable to balance loads, take advantage of excess capacity, and allow ready additions and reassignments of elements to optimize network performance. Given the number of endpoints 18 and media gateways 16, the manual provisioning of the prior art has become unduly complex, and given the volumes of elements, the ability to efficiently reconfigure to optimize the network is diminished. Accordingly, the present invention introduces a new element or logical function, generally referred to as a service broker 26, which is capable of automatically assigning and provisioning the media gateways 16, gateway controllers 14, and call servers 12, according to defined rules created to control expansion, react to failures, and optimize the network.

The service broker 26 provisions the media gateways 16, gateway controllers 14, and call servers 12, directly or indirectly via the respective element managers 24, 22, 20. A database 28 is provided to keep a network view of the configurations and associations of the various elements. Preferably, the service broker 26 will access and update the database 28 during operation. Accordingly, the service broker 26 provides automated registration, allocation, and reallocation of media gateways 16, gateway controllers 14, and call servers 12. Further, the service broker 26 can monitor loads and determine capacity for the various elements to facilitate network expansion and optimization. As an example, the configuration of FIG. 1 has allocated media gateways A and B (16) with gateway controller A (14), which is supported by call server A (12). Gateway controller B (14) is also supported by call server A (12), and supports media gateways C and D (16). Call server B (12) supports gateway controller C (14), which further supports media gateways E and F (16). Call server C (12) supports gateway controller D (14), which supports media gateways G and H (16).

Figure 2:
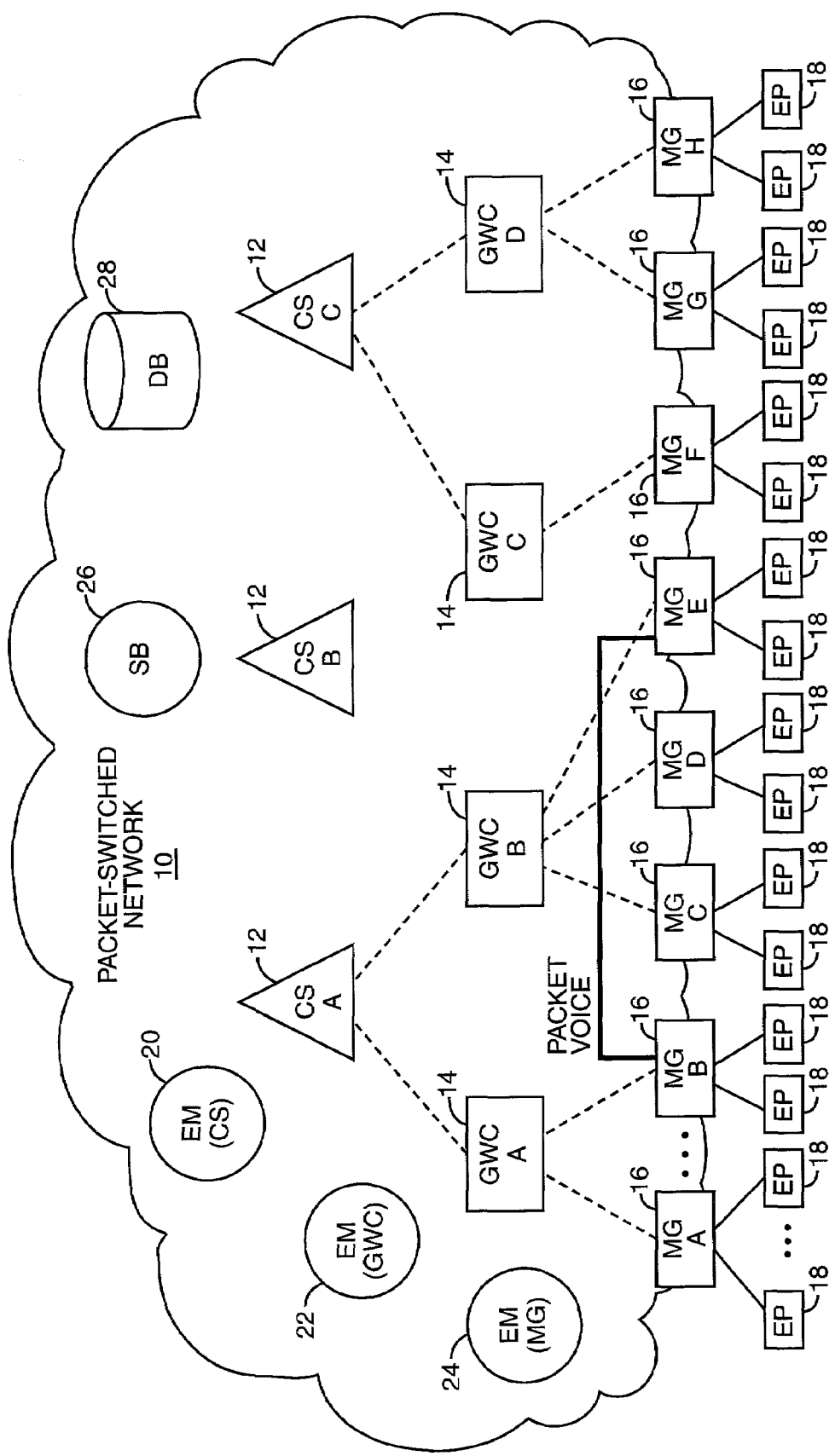
FIG. 2 is a communication network configured according to a second embodiment of the present invention.

An exemplary situation requiring reallocation among elements is when call server B (12) fails. Assume that the configuration described above and illustrated in FIG. 1 has been configured by the service broker 26 to provide the necessary reallocations as illustrated in FIG. 2 when call server B (12) fails. Upon failure, gateway controller C (14) is reallocated to call server C (12). Further, due to load balancing considerations, assume that media gateway E (16) is reallocated to gateway controller B (14) from gateway controller C (14). Accordingly, the service broker 26 will react to the failure by reallocating and registering the devices as illustrated in FIG. 2. Those skilled in the art will recognize the various degrees of reconfiguration and expansion, and realize that the example of FIG. 2 is merely provided to illustrate the reconfigurability of the elements associated with the packet-switched network 10 to support communications between the endpoints 18. The following discussion outlines exemplary processes for provisioning a media gateway 16, provisioning a gateway controller 14, reallocating elements in response to failures, and scaling networks to add new elements.

Figure 3:
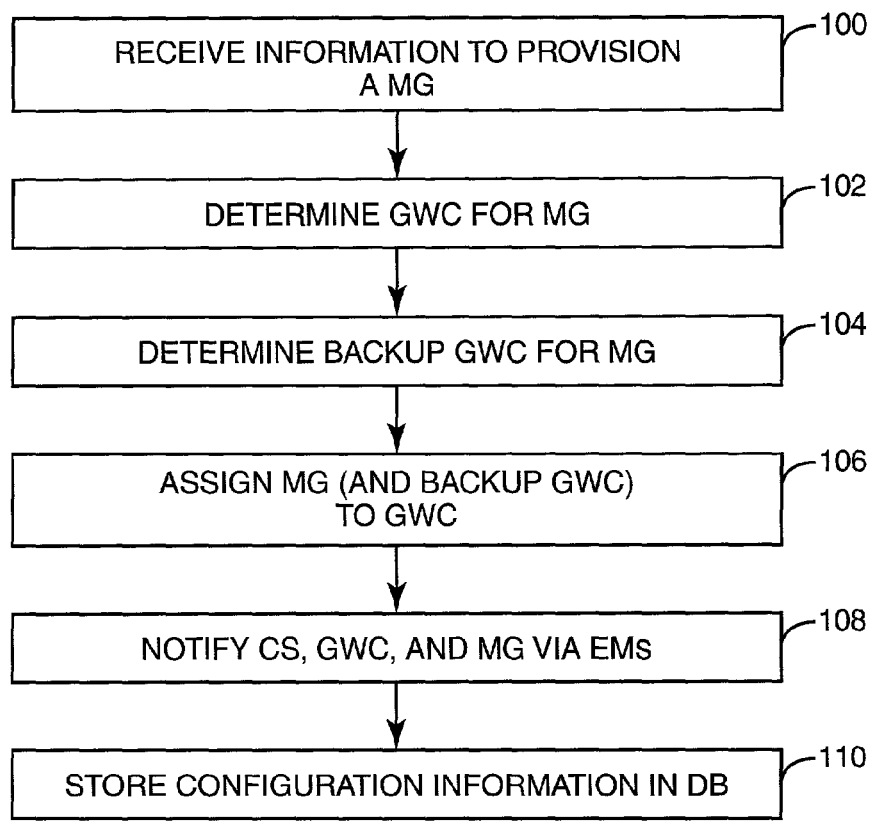
FIG. 3 is a flow diagram for provisioning a media gateway according to one embodiment of the present invention.

With reference to FIG. 3, an exemplary flow is illustrated for provisioning a media gateway 16 from the perspective of the service broker 26. The process begins when the service broker 26 receives information to provision a media gateway 16 (step 100). The information may include a profile for the media gateway 16, which may include the name of the media gateway 16, the type of service provided by the media gateway 16, and the number of endpoints 18 supported or otherwise terminated by the media gateway 16. For a PSTN-based media gateway 16, the service type may identify whether trunks, lines, or a combination thereof are used, and the telephony standard for communicating over those trunks or lines. Cable and wireless media gateways 16 would provide similar profiles. The information may also include a fully qualified domain name or an IP address for the media gateway 16, the protocol used for communicating with the media gateway 16 over the packet-switched network 10, a protocol port, and a version of the protocol. The protocol information typically includes the protocol and selected version to facilitate communications with the gateway controller 14, which will be assigned to support the media gateway 16. Example protocols are Megaco, H.248, SIP (Session Initiation Protocol), and MGCP (Media Gateway Control Protocol). Although the service broker 26 may automatically determine allocations between media gateways 16, gateway controllers 14, and call servers 12, the information received to provision the media gateway 16 may allow for the specification of a selected gateway controller 14 or call server 12. Further, much of the information identified above can be accessed in various types of databases based on the name of the media gateway 16 or other identification therefor.

Once the information to provision the media gateway 16 is received, the service broker 26 will determine a gateway controller 14 for the media gateway 16 (step 102). The service broker 26 may take into consideration many types of information when selecting a gateway controller 14 for the media gateway 16. For example, the service broker 26 may select a gateway controller 14 capable of matching the service type and protocol used by the media gateway 16 in addition to analyzing the maximum capacity of the media gateway 16 and the actual or normal capacity of the media gateway 16 or similarly situated media gateways 16. In addition to determining a primary gateway controller 14 for the media gateway 16, a backup gateway controller 14 may be determined (step 104). Next, the service broker 26 will assign the media gateway 16, and a backup gateway controller 14, if selected, to the primary gateway controller 14 (step 106).

Once assigned, the service broker 26 will notify all of the affected elements, which will typically include the media gateway 16, gateway controller 14, and call server 12 (step 108). In one embodiment, the service broker 26 will identify the supporting gateway controller 14 to the media gateway 16 via the element manager 24; identify the media gateway 16 to the gateway controller 14 via the element manager 22; and identify the association between the media gateway 16 and gateway controller 14 to the call server 12 via the element manager 20. The information provided with notification is sufficient to fully configure and provision the various elements to interact with one another according to the determined allocations. Further, any endpoint-related information required by the call server 12 or gateway controller 14 may be provided to those elements. Once the affected elements are notified, the service broker 26 will store the new configuration information in the database 28 (step 110).

Figure 4:
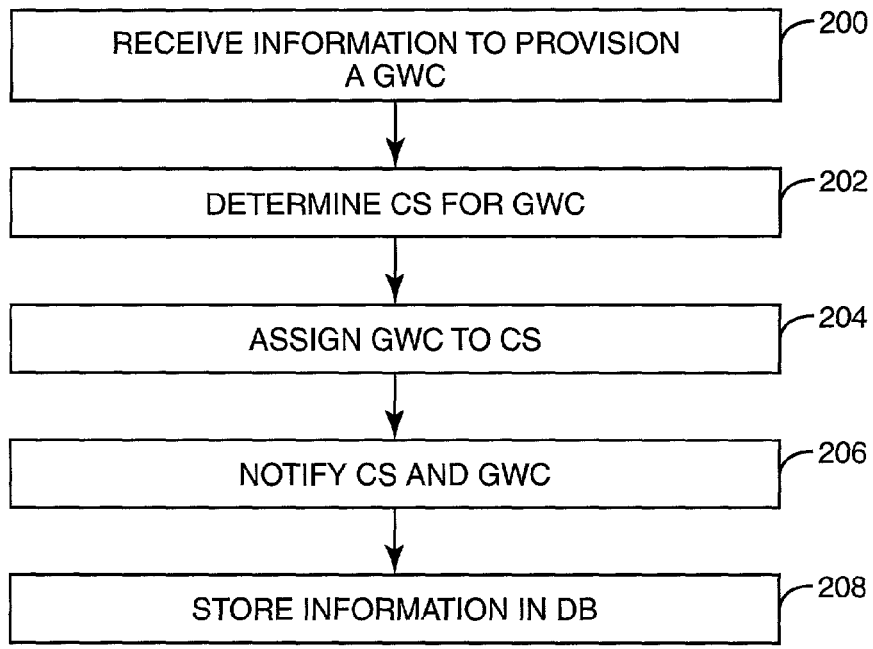
FIG. 4 is a flow diagram for provisioning a gateway controller according to one embodiment of the present invention.

A process for adding a gateway controller 14 is outlined in FIG. 4. The process begins when the service broker 26 receives information to provision a gateway controller 14 (step 200). The service broker 26 will analyze the network configuration stored in the database 28, and determine a call server 12 to support the gateway controller 14, based on loads, capacities, capabilities, network parameters, or a combination thereof (step 202). The service broker 26 will assign the gateway controller 14 to the selected call server 12 (step 204) by notifying both the notified call server 12 and the gateway controller 14 of the allocation and association (step 206). Preferably, the call server 12 is selected to provide an even or otherwise specified distribution of gateway controllers 14 among call servers 12. The distribution may be based on endpoints 18, actual load, available capacity, geographic location of network signaling gateways, or a combination thereof. Those skilled in the art will recognize additional factors that may be used in whole or part for selecting a call server 12 for a gateway controller 14. Further, the call server 12 and gateway controller 14 are preferably notified via their respective element managers 20 and 22. Again, the basic information necessary for cooperation between the call server 12 and gateway controller 14 is provided during notification. Once notification is provided, the service broker 26 will store the configuration information in the database 28 to update the network view (step 208). Once a media gateway 16 or a gateway controller 14 is provisioned, the call server 12 will be able to control media sessions involving associated endpoints 18. The basic provisioning described above provides the fundamentals for reallocations based on element failures, as well as scaling the network to accommodate growth. In one embodiment, provisioning of the various elements occurs through the respective element managers 20, 22, 24.

Figure 5:
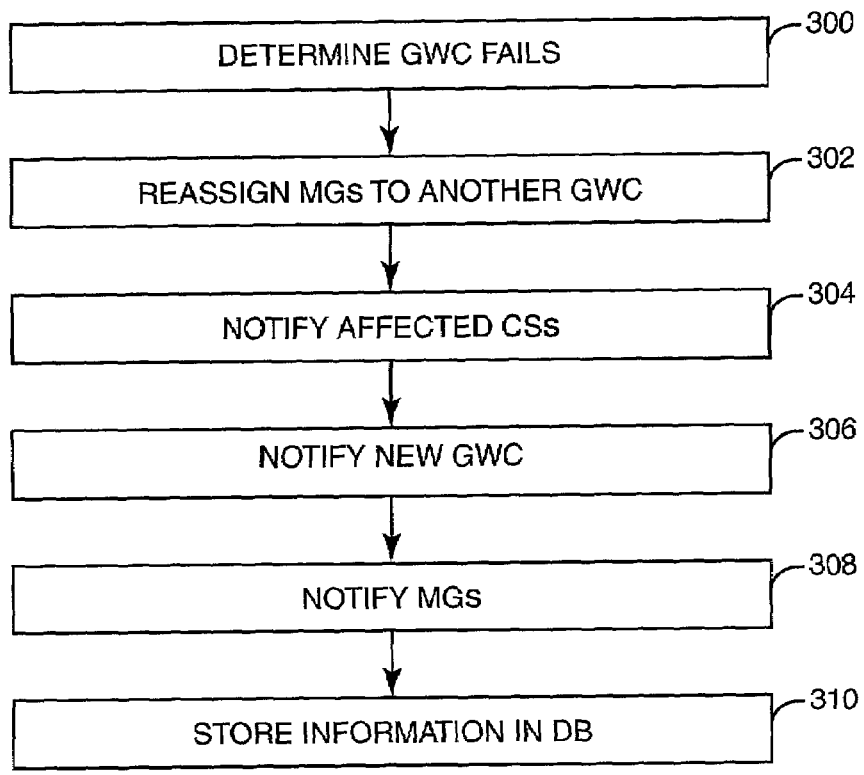
FIG. 5 is a flow diagram illustrating survivability when a gateway controller fails according to one embodiment of the present invention.

As illustrated in FIG. 5, the service broker 26 can support dynamic reallocation when an element fails. The particular example is when a gateway controller 14 fails. Initially, the service broker 26 will determine that the gateway controller 14 has failed (step 300) and reassign the media gateways 16 associated with the failed gateway controller 14 to one or more other gateway controllers (step 302). The service broker 26 can determine failure of an element in any number of ways, such as periodically polling elements, or receiving indication of a failure from the failed element or an element associated with the failed element. Reassignment of media gateways 16 to operating gateway controllers 14 may be based on various criteria, including available capacity, current or average loads, and the like. Once the service broker 26 has determined how to reassign the media gateway 16 to other gateway controllers 14, the affected elements are notified. In particular, the service broker 26 will notify the affected call servers 12 (step 304), the new gateway controller 14 (step 306), and the media gateways 16 being reassigned (step 308). Again, the notification information is sufficient to alert each of the elements of the pertinent reassignments, and will include the necessary information to facilitate communications between the elements according to the reassignments. The notifications will effectively provision the affected elements. Once notification is complete, the service broker 26 will store the information in the database 28 to update the network view (step 310). An analogous process would be provided for the failure of a call server 12. In either case, the service broker 26 may identify the backup elements based on previous provisioning or in real time based on capabilities, capacities, and load balancing.

Figure 6:
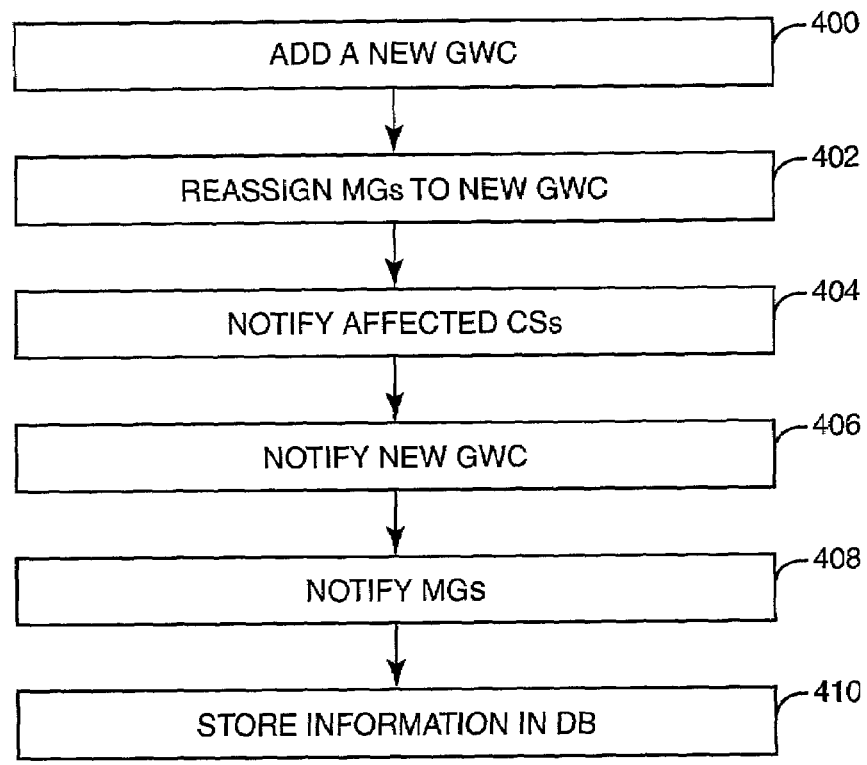
FIG. 6 is a flow diagram illustrating scalability of gateway controllers according to one embodiment of the present invention.

In addition to facilitating the survivability of elements as outlined above, the service broker 26 can dynamically control scaling of the network when new elements are added. As illustrated in FIG. 6, the service broker 26 can efficiently allocate new elements, such as a gateway controller 14, and provision affected elements in a dynamic fashion. Initially, the service broker 26 determines that there is a need to add a new gateway controller 14 (step 400), and determines how to reassign existing media gateways 16, which are currently being served by an existing gateway controller 14, to the new gateway controller 14 (step 402). Again, the reassignment of selected media gateways 16 to the new gateway controller 14 or redistribution of media gateways 16 among the new and existing gateway controllers 14 may be based on a combination of capabilities, capacity, and load balancing to optimize the network while meeting desired quality of service levels. Once the service broker 26 has determined the necessary reassignments of the media gateways 16, the affected elements are notified. In particular, the service broker 26 will notify the affected call servers 12 that support the new gateway controller 14, as well as call servers 12 supporting existing gateway controllers 14, which were affected by the addition of the new gateway controller 14 (step 404). The service broker 26 will notify the new gateway controller 14 (step 406) and the affected media gateways 16 (step 408) to provide the necessary provisioning and configuration information. Finally, the service broker 26 will store the information in the database 28 to update the network view (step 410). An analogous process is provided for the addition of new media gateways 16 as well as new call servers 12.

In essence, the service broker 26 monitors elements and network configurations, loads, capacities, and the like, and provides dynamic provisioning for new elements and the reallocation of existing elements. Whether adding a new element or reallocating associations between elements, the service broker 26 dynamically provisions all affected elements to ensure continuity of service and cooperation between the network elements.

Figure 7:
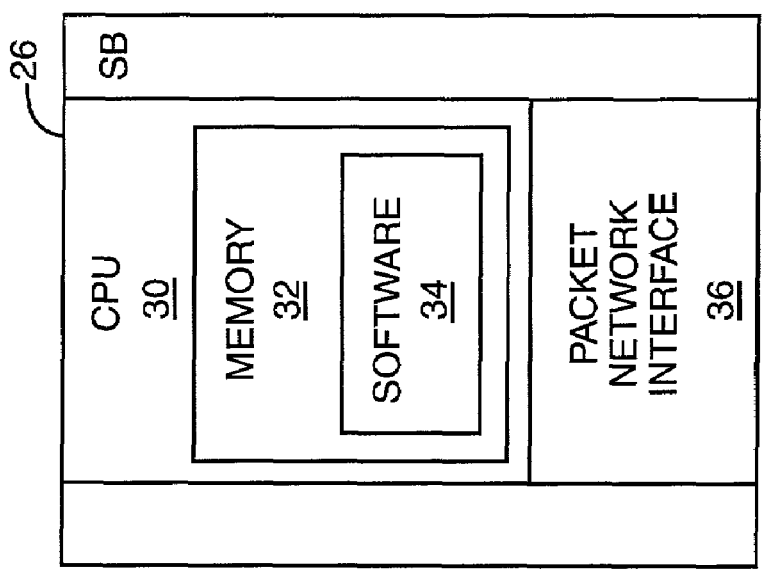
FIG. 7 is a block representation of a service broker configured according to one embodiment of the present invention.

FIG. 7 is a logical schematic of a service broker 26 having a central processing unit (CPU) 30 with associated memory 32 and software 34. The software 34 is configured to implement the dynamic provisioning and configuring functionality described above. The service broker 26 will have a packet network interface 36 capable of communicating with elements attached to the packet-switched network 10. The service broker 26 may be implemented as a standalone device or implemented on various devices alone or with other functions, such as the call server 12, media gateway 16, and the like. The service broker 26 may also have a user or device interface to establish rules and logic for operation.

In general, the service broker 26 provides numerous functions. The service broker 26 can automatically choose gateway controllers 14 for media gateways 16, call servers 12 for gateway controllers 14, and backups for the media gateways 16 and gateway controllers 14. The service broker 26 can automatically register media gateways 16 and support dynamic reconfiguration and provisioning when a gateway controller 14 or call server 12 fails. Additionally, the service broker 26 can provide dynamic load balancing of media gateways 16 on or among gateway controllers 14. Reallocations and reconfigurations can be provided periodically or in response to network conditions to ensure optimization. These abilities enhance the scalability of the network, in addition to enhancing network performance.

For load balancing, the service broker 26 can dynamically assign media gateways 16 to gateway controllers 14 based on actual loads and available capacity. If a certain gateway controller 14 has more available capacity, new media gateways 16 will be added to those gateway controllers 14 having more available capacity. Optionally, existing media gateways 16 can be switched over to new gateway controllers 14 if the subscriber or network providers desire. Preferably, backup and failure options are accounted for during capacity determinations during registration. The service broker 26 allows for elements to fail over to a backup element when they fail. The service broker 26 will assign a backup parent to the element. When the parent fails, the child is switched to a new parent, until the failed parent becomes operable again. In one embodiment, one gateway controller 14 can be specified as a backup for multiple gateway controllers 14 to provide "N+1" sparing. Rather than requiring a specified backup, having only one spare for an entire group saves resources. The service broker 26 will determine which, if any, media gateways 16 will be served by the spare gateway controller 14 at any given time.

Survivability of the network during failures may be enhanced using geographic redundancy. Since survivability is the ability of a system to withstand destruction of part of its components and to have the remaining ones still function, the service broker 26 can reallocate a media gateway 16 or gateway controller 14 to a new call server 12 if a call server 12 gets destroyed. Assigning backup call servers 12 at geographically disparate locations minimizes the impact of failures caused by geographic incidents. Scalability and survivability can be further enhanced by decoupling endpoints 18 from specific call servers 12. The service broker 26 allows for endpoints 18 to receive service from any assigned call server 12. Accordingly, the service broker 26 can assign each endpoint 18 to a call server 12 in a cluster of call servers 12 during registration and provisioning. Although call servers 12 in a cluster may be geographically dispersed, they each provide a similar set of endpoint services.

Figure 8:
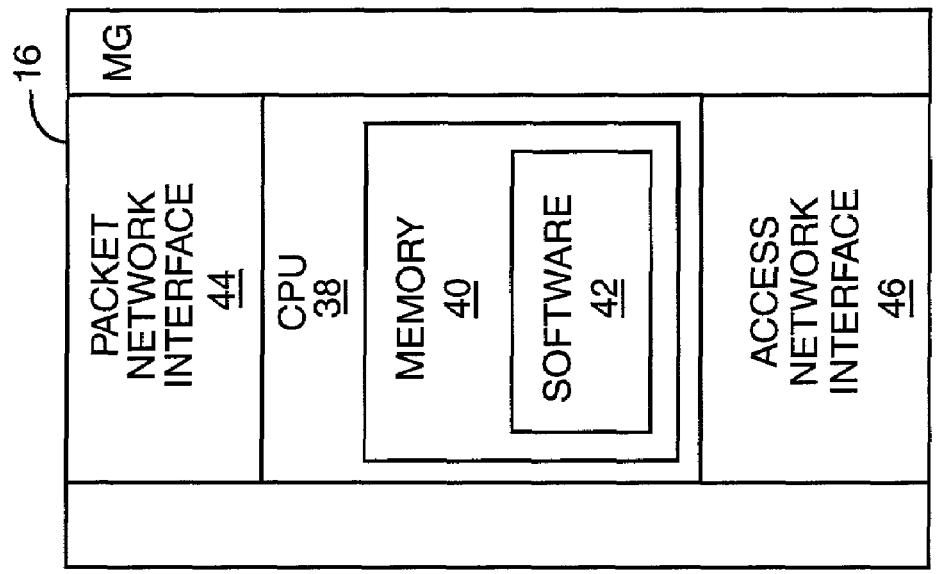
FIG. 8 is a block representation of a media gateway configured according to one embodiment of the present invention.

In FIG. 8, a block schematic of a generalized media gateway 16 is shown having a CPU 38 containing memory 40 and the requisite software 42 for operation. The CPU 38 cooperates to provide a bi-directional interface between a packet network interface 44 and an access network interface 46. The packet network interface 44 is operatively connected to the packet-switched network 10, while the access network interface 46 is the interface opposite the packet network interface 44 and interfaces with the endpoints 18 over the various access networks. In a telephony embodiment, the access network interface 46 would interface with traditional trunks and lines of a telephone network or like network system to connect to endpoints 18. In a cable modem embodiment, the access network interface 46 would interface with a cable television network.

Those skilled in the art will recognize improvements and modifications to the preferred embodiments of the present invention. All such improvements and modifications are considered within the scope of the concepts disclosed herein and the claims that follow.

What is claimed is:

1. A system for implementing a service broker comprising:
   a) a network interface; and
   b) a processor associated with the network interface and adapted to:
      i) determine gateway controllers to support media gateways to define first associations;
      ii) determine call servers to support the gateway controllers to define second associations;
      iii) communicate with the media gateways, the gateway controllers, and the call servers via the network interface;
      iv) provision the media gateways for the first associations;
      v) provision the gateway controllers for the first and second associations;
      vi) provision the call servers for the second associations;
      vii) receive information for a new media gateway;
      viii) determine a select gateway controller for the new media gateway;
      ix) provision the select gateway controller to support the new media gateway; and
      x) provision the new media gateway to use the select gateway controller for support.

2. The system of claim 1 wherein the processor is further adapted to:
   a) determine a backup gateway controller for the new media gateway;
   b) provision the backup gateway controller as a backup for the new media gateway; and
   c) provision the new media gateway to use the backup gateway controller if the select gateway controller fails.

3. The system of claim 1 wherein the processor is further adapted to provision the call server to associate the new media gateway with the select gateway controller.

4. A system for implementing a service broker comprising:
   a) a network interface; and
   b) a processor associated with the network interface and adapted to:
      i) determine gateway controllers to support media gateways to define first associations;
      ii) determine call servers to support the gateway controllers to define second associations;
      iii) communicate with the media gateways, the gateway controllers, and the call servers via the network interface;
      iv) provision the media gateways for the first associations;
      v) provision the gateway controllers for the first and second associations;
      vi) provision the call servers for the second associations;
      vii) receive information for a new gateway controller;
      viii) determine a select call server for the new gateway controller;
      ix) provision the select call server to support the new gateway controller; and
      x) provision the new gateway controller to use the select call server for support.

5. The system of claim 4 wherein the processor is further adapted to:
   a) determine a backup call server for the new gateway controller;
   b) provision the backup call server to support the new gateway controller; and
   c) provision the new gateway controller to use the backup call server for support if the select call server fails.

6. A system for implementing a service broker comprising:
   a) a network interface; and b) a processor associated with the network interface and adapted to:
  i) determine gateway controllers to support media gateways to define first associations;
  ii) determine call servers to support the gateway controllers to define second associations;
  iii) communicate with the media gateways, the gateway controllers, and the call servers via the network interface;
  iv) provision the media gateways for the first associations;
  v) provision the gateway controllers for the first and second associations;
  vi) provision the call servers for the second associations;
  vii) determine a failure for a select gateway controller supporting affected media gateways;
  viii) determine a fail-over gateway controller to support the affected media gateways to define fail-over associations; and
  ix) provision the affected media gateways and the fail-over gateway controller for the fail-over associations.

7. The system of claim 6 wherein the processor is further adapted to inform one of the call servers supporting the fail-over gateway controller of the fail-over associations.

8. A system for implementing a service broker comprising:
  a) a network interface; and
  b) a processor associated with the network interface and adapted to:
    i) determine gateway controllers to support media gateways to define first associations;
    ii) determine call servers to support the gateway controllers to define second associations;
    iii) communicate with the media gateways, the gateway controllers, and the call servers via the network interface;
    iv) provision the media gateways for the first associations;
    v) provision the gateway controllers for the first and second associations;
    vi) provision the call servers for the second associations;
    vii) determine a failure for a select call server supporting affected gateway controllers;
    viii) determine a fail-over call server to support the affected gateway controllers to define fail-over associations; and
    ix) provision the affected gateway controllers and the fail-over call server for the fail-over associations.

9. The system of claim 1 wherein the processor is adapted to communicate with the media gateways, the gateway controllers, and the call servers indirectly through managing devices associated therewith.

10. The system of claim 1 wherein the processor is adapted to directly communicate with the media gateways, the gateway controllers, and the call servers indirectly over a packet-switched network.

11. A method for implementing a service broker comprising:
  a) determining gateway controllers to support media gateways to define first associations;
  b) determining call servers to support the gateway controllers to define second associations;
  c) provisioning the media gateways for the first associations;
  d) provisioning the gateway controllers for the first and second associations;
  e) provisioning the call servers for the second associations;
  f) receiving information for a new media gateway;
  g) determining a select gateway controller for the new media gateway;
  h) provisioning the select gateway controller to support the new media gateway; and
  i) provisioning the new media gateway to use the select gateway controller for support.

12. The method of claim 11 further comprising:
  a) determining a backup gateway controller for the new media gateway;
  b) provisioning the backup gateway controller as a backup for the new media gateway; and
  c) provisioning the new media gateway to use the backup gateway controller if the select gateway controller fails.

13. The method of claim 11 further comprising provisioning the call server to associate the new media gateway with the select gateway controller.

14. The method of claim 11 further comprising:
  a) receiving information for a new gateway controller;
  b) determining a select call server for the new gateway controller;
  c) provisioning the select call server to support the new gateway controller; and
  d) provisioning the new gateway controller to use the select call server for support.

15. The method of claim 14 further comprising:
  a) determining a backup call server for the new gateway controller;
  b) provisioning the backup call server to support the new gateway controller; and
  c) provisioning the new gateway controller to use the backup call server for support if the select call server fails.

16. A method for implementing a service broker comprising:
  a) determining gateway controllers to support media gateways to define first associations;
  b) determining call servers to support the gateway controllers to define second associations;
  c) provisioning the media gateways for the first associations;
  d) provisioning the gateway controllers for the first and second associations;
  e) provisioning the call servers for the second associations;
  f) determining a failure for a select gateway controller supporting affected media gateways;
  g) determining a fail-over gateway controller to support the affected media gateways to define fail-over associations; and
  h) provisioning the affected media gateways and the fail-over media gateway for the fail-over associations.

17. The method of claim 16 further comprising informing one of the call servers supporting the fail-over gateway controller of the fail-over associations.

18. A method for implementing a service broker comprising:
  a) determining gateway controllers to support media gateways to define first associations;
  b) determining call servers to support the gateway controllers to define second associations;
  c) provisioning the media gateways for the first associations;

d) provisioning the gateway controllers for the first and second associations;

e) provisioning the call servers for the second associations;

f) determining a failure for a select call server supporting affected gateway controllers;

g) determining a fail-over call server to support the affected gateway controllers to define fail-over associations; and h) provisioning the affected gateway controllers and the fail-over call server for the fail-over associations.

19. A computer readable medium having software for implementing a service broker, the software comprising instructions to instruct a processor to:

a) determine gateway controllers to support media gateways to define first associations;

b) determine call servers to support the gateways controllers to define second associations;

c) provision the media gateways for the first associations;

d) provision the gateway controllers for the first and second associations;

e) provision the call servers for the second associations;

f) receive information for a new media gateway;

g) determine a select gateway controller for the new media gateway;

h) provision the select gateway controller to support the new media gateway; and i) provision the new media gateway to use the select gateway controller for support.

20. The computer readable medium of claim 19 wherein the software further comprises instructions to instruct the processor to:

a) determine a backup gateway controller for the new media gateway;

b) provision the backup gateway controller as a backup for the new media gateway; and c) provision the new media gateway to use the backup gateway controller if the select gateway controller fails.

21. The computer readable medium of claim 19 wherein the software further comprises instructions to instruct the processor to provision the call servers to associate the new media gateway with the select gateway controller.

22. The computer readable medium of claim 19 wherein the software further comprises instructions to instruct the processor to:

a) receive information for a new gateway controller;

b) determine a select call server for the new gateway controller;

c) provision the select call server to support the new gateway controller; and d) provision the new gateway controller to use the select call server for support.

23. The computer readable medium of claim 22 wherein the software further comprises instructions to instruct the processor to:

a) determine a backup call server for the new gateway controller;

b) provision the backup call server to support the new gateway controller; and c) provision the new gateway controller to use the backup call server for support if the select call server fails.

24. The computer readable medium of claim 19 wherein the software further comprises instructions to instruct the processor to:

a) determine a failure for the select gateway controller supporting affected media gateways;

b) determine a fail-over gateway controller to support the affected media gateways to define fail-over associations; and c) provision the affected media gateways and the fail-over media gateway for the fail-over associations.

25. The computer readable medium of claim 24 wherein the software further comprises instructions to instruct the processor to inform one of the call servers supporting the fail-over gateway controller of the fail-over associations.

26. The computer readable medium of claim 19 wherein the software further comprises instructions to instruct the processor to:

a) determine a failure for a select call server supporting affected gateway controllers;

b) determine a fail-over call server to support the affected gateway controllers to define fail-over associations; and c) provision the affected gateway controllers and the fail-over call server for the fail-over associations.

* * * * *